United States Patent [19]
Weiss

[11] 3,727,507
[45] Apr. 17, 1973

[54] SEMI-CHISEL CUTTER LINK FOR SAW CHAIN

[75] Inventor: Werner Weiss, Burlington, Ontario, Canada

[73] Assignee: Sabre Saw-Chain, Ltd., Burlington-Ontario, Canada

[22] Filed: Nov. 8, 1971

[21] Appl. No.: 196,527

[52] U.S. Cl. ................................................. 83/831
[51] Int. Cl. ............................................. B27b 33/14
[58] Field of Search ..................... 143/135 G, 135 H, 143/135 R

[56] References Cited

UNITED STATES PATENTS

| | | |
|---|---|---|
| 2,744,548 | 5/1956 | Stephenson et al. .............. 143/135 G |
| 3,200,861 | 8/1965 | Merz ................................ 143/135 G |
| 3,376,906 | 4/1968 | Gasner ............................ 143/135 G |

Primary Examiner—Donald R. Schran
Attorney—Harold J. Birch et al.

[57] ABSTRACT

A cutter link for a saw chain having a continuous cutting edge with a leading first cutting point and a second cutting point disposed rearwardly of the first cutting point. The shank and toe portions of the cutter link are connected at their outside juncture by a concave chamfer.

14 Claims, 6 Drawings

PATENTED APR 17 1973  3,727,507

SEMI-CHISEL CUTTER LINK FOR SAW CHAIN

DESCRIPTION OF THE PRIOR ART

Cutters of the prior art generally fall into one of two classifications: chipper teeth and chisel teeth. The cross-section configuration of the conventional chipper tooth is illustrated in FIG. 1 on the drawings. The chipper tooth has a generally rounded configuration or "C" shape. The leading surface of such a cutter is beveled rearwardly and inwardly, thereby forming a continuous cutting edge along the outside of the curved portion and the top of the toe. The cutting edge can be readily sharpened with a round file of suitable diameter. Because of the ease with which it can be sharpened by a person without special training or long experience, the chipper configuration has been quite popular. But, the chipper tooth has a relatively inefficient cutting action which consequently is also comparatively slow, particularly on soft wood.

FIG. 2 on the drawings illustrates a conventional chisel type cutter. The chisel tooth has an outwardly and upwardly extending shank portion and a generally laterally extending toe portion which meet in an abrupt angle or vertex giving the tooth a bent "L" shape. The forward faces of the shank and toe are beveled rearwardly and inwardly thereby forming cutting edges along the outside of the shank and toe portions. The cutting edges meet in a sharp cutting point at the vertex of the tooth. Chisel cutters generally have a relatively efficient and consequently comparatively rapid cutting action. But, the chisel tooth is difficult to sharpen. The toe portions must be separately sharpened with a flat file, the shank portion with a round file. The filing angles are so critical that special training or long experience is necessary for a person to efficiently sharpen the cutters.

Many attempts have heretofore been made to combine the advantages of the chipper tooth and the chisel tooth in a single cutter, but to my knowledge none of these prior attempts has been successful.

Accordingly, it is an object of this invention to provide a cutter tooth for saw chain which combines the advantages of the chipper tooth with those of the chisel tooth, namely, ease of sharpening with smooth, efficient and rapid cutting capability.

It is also an object of this invention to provide a cutter tooth which can be easily and economically manufactured in a progressive die.

These objectives are achieved by providing a cutter link for a saw chain comprising a body portion adapted to be included in a saw chain as a art thereof; a shank portion integral with said body portion extending upwardly and outwardly therefrom; an integral toe portion extending laterally inwardly from the extremity of said shank portion; and a concave chamfer at the outside juncture of said shank and toe portions joining the outer surface of said shank portion and the upper surface of said toe portion; the leading surfaces of said shank and toe portions and said concave chamfer being sharpened to form a continuous cutting edge along which are disposed a leading, first cutting point at the juncture of said toe portion and said concave chamfer part a second cutting point, rearward of said first cutting point, at the juncture of said chamfer and said shank portion.

DETAILED DESCRIPTION OF THE PREFERRED EMBODIMENT

The invention will now be explained with reference to the abovementioned drawings wherein like numerals are used to designate like parts throughout.

Figure 3:
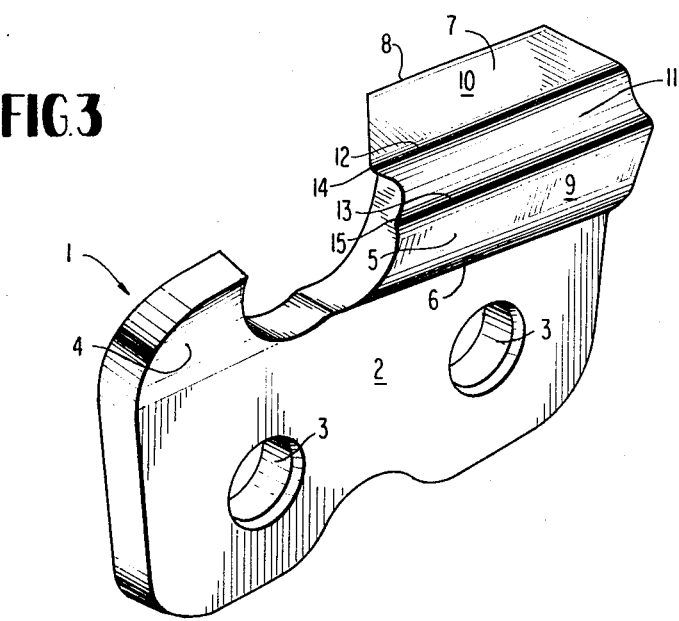
FIG. 3 is a perspective view of the improved cutter link of the present invention.

FIG. 3 is a perspective view showing a complete cutter link 1 adapted to be included in a saw chain as a part thereof. Thus, in the chain assembly, cutter links will be assembled with side links and central drive links pivotally interconnected by rivets as is conventional.

The cutter link comprises a generally flat body portion 2 having a pair of spaced apertures 3 to receive rivets (not shown) which connect the cutter link to side links (also not shown) in the conventional manner to form a complete chain. An integral depth gauge 4 is formed on the forward portion of the body 2. The depth gauge is preferably inclined slightly out of the plane of the body (outwardly in the direction of incline of the shank portion hereinafter described) in order to improve the smoothness during the cutting action of the saw chain.

Figure 1:
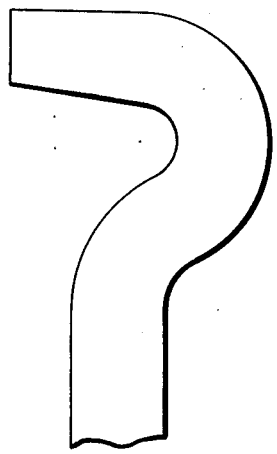
FIG. 1 shows a conventional chipper tooth of the prior art.
Figure 2:
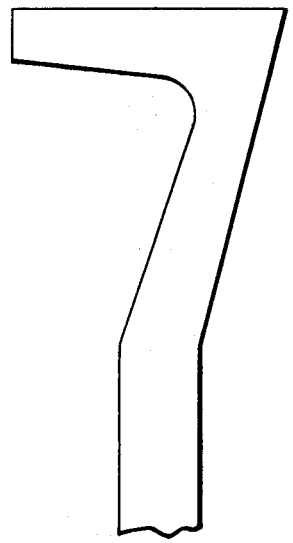
FIG. 2 shows a conventional chisel tooth of the prior art.

Integral with the rearward portion of the body portion 2 is a shank portion 5. In the preferred embodiment, this shank portion is laterally offset from the plane of the body portion by a connecting portion 6, more clearly seen in FIG. 5. WHile it is preferred to have the shank offset as shown for the purpose of increasing the smoothness of the cutting operation, it is also within the scope of the invention, to form the shank leading directly from the body portion as in the conventional chisel tooth shown in FIG. 2.

An integral toe portion 7 extends laterally inwardly from the extremity of the shank portion and terminates in an edge or tip 8. It is preferred that this toe portion be sufficiently long as to extend beyond the median plane of the saw chain of which the novel cutter link is a part, but it is also possible to arrange the various cutter teeth of a saw chain with other chain completing parts in such a way that the toe portion may be shorter if desired.

The outer surface 9 of the aforementioned shank portion 5 and the upper surface 10 of the aforementioned toe portion 7 are joined by a concave chamfer 11. This chamfer is best visualized by viewing FIG. 5.

Figure 4:
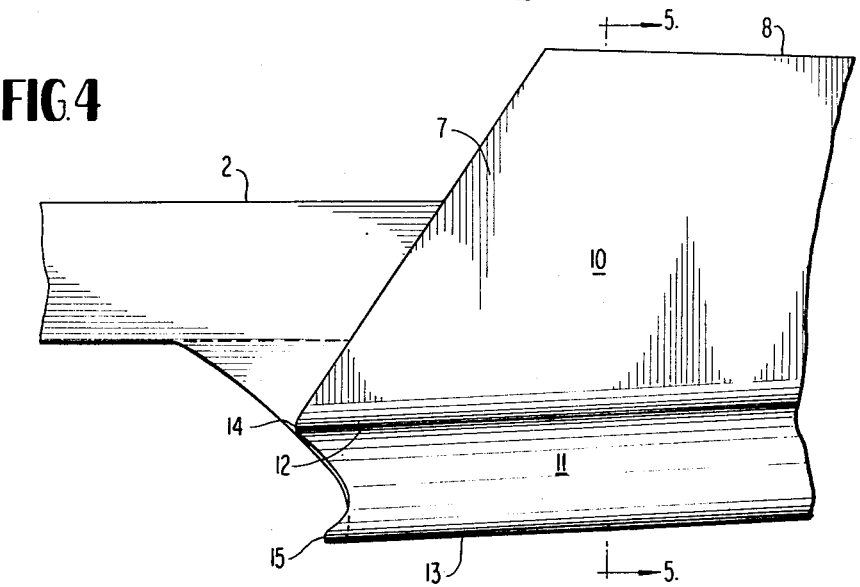
FIG. 4 is a top plan view of a portion of the cutting edge of the improved cutter tooth of the present invention.
Figure 6:
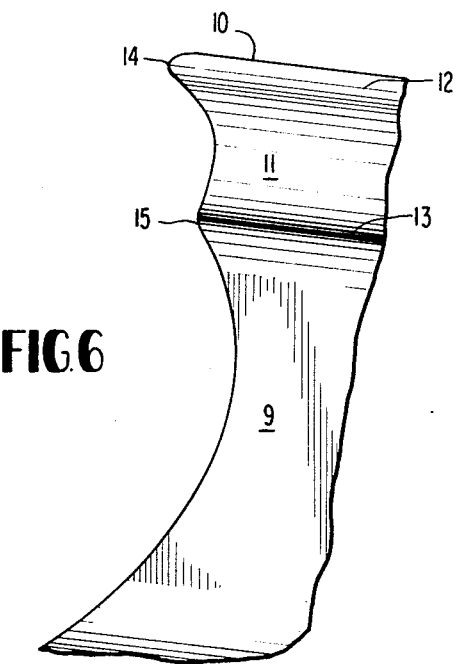
FIG. 6 is a side view of the cutting edge of the improved cutter tooth as viewed from the line 6—6 of FIG. 5.

The forward face of the cutter tooth is sharpened to provide a continuous cutting edge extending along the forward extremities of the top surface of the toe portion, the concave chamfer portion, and the outer surface of the shank portion. The forward face of the toe portion recedes from the juncture of the toe portion and the chamfer portion to the edge or tip 8 of the toe portion, thereby resulting in a swept-back configuration as shown in FIG. 4. The concave chamfer 11 is joined to the upper surface 10 of the toe portion and the outer surface 9 of the shank portion by smooth curves 12 and 13. When the face of the cutter tooth is sharpened, th concave chamfer 11 is reduced behind the curved connecting portions 12 and 13 giving rise to two cutting points 14 and 15 at the junctures of the concave chamfer with the aforesaid toe and shank portions, respectively. As can be clearly seen in FIGS. 4 and 6, cutting point 14 projects further forward than cutting point 15 and thus is termed the "leading" cutting point. It is believed that the presence of these two cutting points gives the improved cutter its smooth, rapid, chisel-like cutting action and its characteristic ability to retain a sharp cutting edge for a long period of time.

In the preferred embodiment shown in the drawings, the toe portion of the cutter is generally perpendicular to the plane of the body portion of the cutter link. It is also possible to incline the toe portion upwardly or downwardly so that the toe portion forms an angle other than 90° with the plane of the body portion without departing from the scope of the invention. This might be done, for example, to modify cutting characteristics for special applications.

The cutting efficiency of the improved cutting link has been found to depend on several geometric factors, namely: the thickness of the cutting face in the chamfer region and the curvature of the outer surface at the cutting points.

Cutting efficiency has been found to be enhanced when the thickness of the chamfer is as small as possible. Obviously, if the chamfer is too thin, the cutter is going to be structurally weak and will not be able to withstand the stresses and strains of continued operation. It has been found that by cold-forming the cutter link, a degree of compressive stress is introduced in the chamfer region, particularly at the areas around the thinnest portion of chamfer 11 and at cutting points 14 and 15, which makes it possible for the chamfer region to be thinner than the body plate. Optimum balance between strength and cutting efficiency has been found to be present when the thickness of the chamfer is approximately two-thirds the sum of the thickness of the body plate and the radius of the arc joining the inner surface of the shank portion to the lower surface of the toe portion. This is generally expressed by the relation $T_c$ is approximately equal to $\frac{2}{3}(R_i + T)$, where $T_c$ is the thickness of the cutter at the narrowest point of the chamfer region, $R_i$ is the radius of the arc joining the inner surface of the shank portion with the lower surface of the toe portion, T is the thickness of the body portion, and $R_i$ is less than $\frac{1}{2}$ T. The sharper the bend is between the shank and toe portions, i.e., the smaller the radius of curvature of the arc joining them, and thinner the cutter is at the thinnest point of the chamfer; the weaker the cutter link will be.

The cutting efficiency has also been found to vary depending on the curvature of the arcs joining the upper surface of the toe portion and the outer surface of the shank portion to the concave chamfer. Changes in these curves cause changes in the proportions of the cutting points. Generally, the smaller the radius of curvature of the arcs, the shorter and flatter the cutting points will be. Optimum cutting smoothness and rapidity have been found to be present when the radius of each of the arcs satisfies the relation that $\frac{1}{4}(R_i + T)$ is less than $R_o$ and $R_o$ is less than $5/6(R_i + T)$, where $R_o$ is the radius of the arc joining either the outer surface of the shank portion or the upper surface of the toe portion with the concave chamfer, $R_i$ is the radius of the arc joining the inside surface of the shank with the lower surface of the toe portion, and T is the thickness of the body portion. Curved portions having radii lying in this range result in the formation of the most efficient cutting points.

It is important to note that the cutter link represented by the preferred embodiment of this invention can be formed by a cold forming process in a progressive die. This makes possible economical manufacture of the cutter links since other methods of manufacture, such as casting and machining, are considerably more expensive. The cold forming operation of the chamfer induces a degree of compressive stress into the chamfer region of the cutter which strengthens the cutter in this region and makes it possible to produce the cutter with a smaller cross section thickness in the chamfer region than could otherwise be done; thereby enhancing the cutter efficiency by reducing the area of the cutting face.

Figure 5:
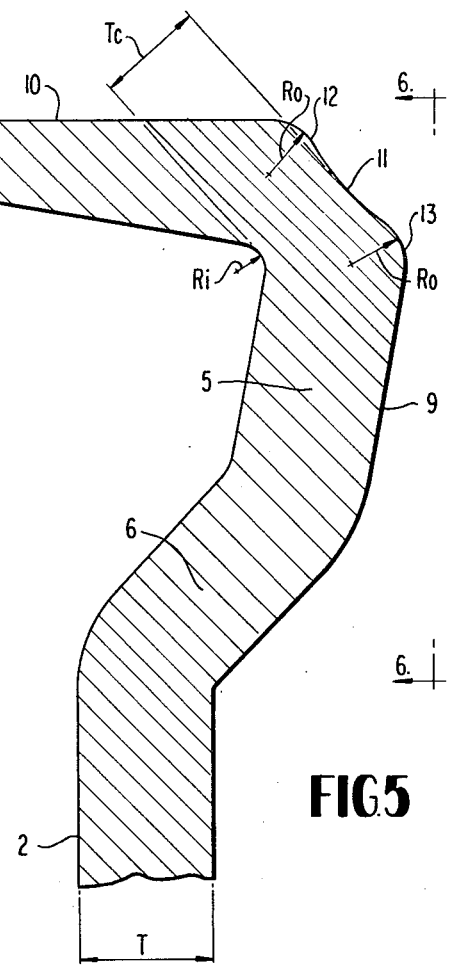
FIG. 5 is a view of the cutting face of the improved cutter tooth as seen from the line 5—5 of FIG. 4.

In this respect, it is also possible to progressively decrease the thickness of the toe portion from the juncture of the shank and toe portions to the tip 8 of the toe portion as shown in FIG. 5. Less strength is required near the tip so that the strength of the thinner portion is adequate to withstand the stress and strain of continued cutting. This tapering operation further enhances the cutting efficiency by further reducing the area of the cutting face.

The cutter link with the concaved chamfer can be easily sharpened with a round file in a single filing operation. Tests have shown the new cutter to have a smooth and rapid cutting capability at least comparable to that of the conventional chisel cutter. Thus, it can be readily seen that the cutter link combines the advantages and overcomes the disadvantages of the prior art cutter teeth.

The embodiment referred to hereinabove has been described only by way of example. Since modifications thereof will undoubtedly occur to those skilled in the art, the scope of the invention is to be limited solely by the scope of the appended claims.

I claim:

1. A cutter link for saw chain comprising a body portion adapted to be included in a saw chain as a part thereof:

a shank portion integral with said body portion extending upwardly and outwardly therefrom;

an integral toe portion extending laterally inwardly from the extremity of said shank portion;

a concave chamfer at the juncture of said shank and toe portions joining the outer surface of said shank portion and the upper surface of said toe portion; and the leading surfaces of said shank and toe portions and said concave chamfer being sharpened to provide a continuous cutting edge.

2. A cutter link for saw chain, said cutter having shank and toe portions and a concave chamfer joining the outer surface of said shank portion to the upper surface of said toe portion; said cutter further having a continuous cutting edge running along said shank portion, concave chamfer and toe portion along which are disposed;
   a leading first cutting point; and
   a second cutting point rearward of said first cutting point.

3. A cutter as recited in claim 2 wherein said leading first cutting point is disposed at the juncture of said toe portion and said concave chamfer.

4. A cutter as recited in claim 2 wherein said second cutting point is disposed at the juncture of said shank portion and said concave chamfer.

5. A cutter link as recited in claim 1 wherein said concave chamfer meets the top surface of said toe portion in a first smooth curve and the outside surface of said shank portion in a second smooth curve.

6. A cutter link as recited in claim 5 wherein each of said first and second smooth curves is an arc of radios $R_o$ which satisfies the relation $\frac{1}{4}(R_i + T)$ is less than $R_o$ and $R_o$ is less than $5/6 (R_i + T)$ where $R_i$ is the radius of an arc joining the inner surface of the shank portion and the lower surface of the toe portion and T is the thickness of the body portion.

7. A cutter link as recited in claim 1 wherein the thickness of the cutter measured at the narrowest part of the concave chamfer region is less than the thickness of the body portion.

8. A cutter link as recited in claim 7 wherein the thickness of the cutter measured at the narrowest point of the concave chamfer region is approximately $\frac{2}{3}(R_i + T)$ where $R_i$ is the radius of an arc joining the inner surface of the shank portion and the lower surface of the toe portion, T is the thickness of the body portion, and $R_i$ is less than $\frac{1}{2} T$.

9. A cutter link as recited in claim 1 further comprising a depth gauge integral with said body portion forward of said shank and toe portions.

10. A cutter link as recited in claim 9 wherein said integral depth gauge is bent slightly outwardly in the direction of incline of said shank portion.

11. A cutter link as recited in claim 1 wherein said shank portion is offset from said body portion.

12. A cutter link as recited in claim 1 wherein said toe portion is generally perpendicular to the plane of said body portion.

13. A cutter link as recited in claim 1 wherein said toe portion narrows progressively from the juncture of said toe portion with said shank portion to the free end of said toe portion.

14. A cutter link as recited in claim 1 wherein said toe portion extends across the median plane of said chain.

\* \* \* \* \*